(12) United States Patent
Pertuz Comas

(10) Patent No.: US 10,883,907 B2
(45) Date of Patent: Jan. 5, 2021

(54) MULTIAXIAL FATIGUE MACHINE

(71) Applicant: Universidad Industrial de Santander, Bucaramanga (CO)

(72) Inventor: Alberto David Pertuz Comas, Bucaramanga (CO)

(73) Assignee: Universidad Industrial de Santander, Bucaramanga (CO)

( * ) Notice: Subject to any disclaimer, the term of this patent is extended or adjusted under 35 U.S.C. 154(b) by 0 days.

(21) Appl. No.: 16/472,368

(22) PCT Filed: Dec. 14, 2017

(86) PCT No.: PCT/IB2017/057972
§ 371 (c)(1),
(2) Date: Jun. 21, 2019

(87) PCT Pub. No.: WO2018/116092
PCT Pub. Date: Jun. 28, 2018

(65) Prior Publication Data
US 2019/0360905 A1 Nov. 28, 2019

(30) Foreign Application Priority Data
Dec. 23, 2016 (CO) .................. NC2016/0005750

(51) Int. Cl.
*G01N 3/00* (2006.01)
*G01N 3/38* (2006.01)
*G01N 3/20* (2006.01)

(52) U.S. Cl.
CPC ............... *G01N 3/38* (2013.01); *G01N 3/20* (2013.01)

(58) Field of Classification Search
CPC ................................ G01N 3/38; G01N 3/20
USPC ........................................................ 73/810
See application file for complete search history.

(56) References Cited

U.S. PATENT DOCUMENTS

| 4,972,721 A * | 11/1990 | Conti ............... G01N 3/12 73/37.5 |
| 6,718,833 B2 * | 4/2004 | Xie ................. G01N 3/32 73/789 |
| 2004/0016301 A1 * | 1/2004 | Moreno ............. G01N 3/32 73/849 |
| 2020/0049603 A1 * | 2/2020 | Yang ............... G01N 3/56 |

* cited by examiner

*Primary Examiner* — Max H Noori
(74) *Attorney, Agent, or Firm* — The Morales Law Firm; Joseph L. Morales

(57) ABSTRACT

A multiaxial fatigue machine comprising a rotational mechanism; a driven shaft arranged collinearly with a first power shaft of the rotational mechanism and a reciprocating mechanism. The rotational mechanism has a first motor and a first fastening element configured to be connected to a test element that can be also connected to a second fastening element of the driven shaft to transmit to said test element a rotational force produced by the first motor. The reciprocating mechanism has a second power shaft, a second motor, and a linear rotational transmission, wherein the reciprocating mechanism is configured to apply an alternating force on the test element.

10 Claims, 6 Drawing Sheets

MULTIAXIAL FATIGUE MACHINE

1. INVENTION TECHNICAL FIELD

This invention relates to fatigue testing machines, particularly, it relates to machines applying stress to a test sample in different directions, frequencies and phases.

2. PRIOR ART DESCRIPTION

The study of material fatigue behaviour of materials subjected to multi-axial stresses is a field in which research efforts have been focused in recent years. However, even today it is a problem yet to be resolved given every year new methods, adaptations and improvements on existing ones appear.

Prior art shows several documents disclosing multiaxial fatigue machines, as in "Design of Combined Fatigue Testing Machine" (http://www.ijrat.org/downloads/Vol-4/feb-2016/paper%20ID-42201609.pdf consulted on 30 Nov. 2016). This document shows a combined fatigue testing machine using two types of test elements. The first of them is a rectangular test element subjected to alternative stress under tension and compression. Alternative stresses are generated by a cantilevered load applied to one end of the test element. The second test element is a cylindrical test element, connected to the motor by a pulley, and as the element rotates, alternative stresses are applied until it fails. These test elements may be tested at the same time, given the loads applied are set on each test element, and the same load is not applied to the elements, as the first test element is connected to the pulley shaft and with the cantilever weight, and the second test element is connected to the crank mechanism and a fixed point. This limitation translates into the impossibility of testing the same test tube for rotational flexion stresses and alternative flexion and compression, at different stages, in order to determine the effect of fatigue stresses not only on one shaft but on two or more shafts, approaching real conditions, such as the conditions to which power transmission shafts are subjected in automobiles.

On the other hand, U.S. Pat. No. 2,855,801A discloses a machine that performs fatigue tests on structural parts. The machine has a reciprocating member, which includes a support, a tubular shaft coupled to this support, a handwheel connected to the tubular shaft for the rotation, in turn, the handwheel comprises a housing, and a rotating member housed in the housing. Furthermore, the rotary member has its shaft arranged eccentrically relative to the shaft of the flywheel; and a connector located on the rotary member, and adapted to be connected to a reciprocating member of the fatigue-testing machine. The connector has the shaft arranged eccentrically with respect to the shaft of the rotary member, power shaft means arranged within the tubular shaft, a speed reduction mechanism, an input shaft connecting the reduction mechanism to the power shaft means, an output shaft connected to the speed reduction mechanism and projecting into the housing, a power train within said housing connected to the output shaft to be driven by this. Moreover, it has a gear connected to the rotary member and to the power train in order to rotate the rotary member around its eccentric shaft, a front plate connected to the housing, the plate arranged adjacent to the rotary member and being stationary with respect thereof, a friction coupling arranged between the face plate and the rotary member. This setup, although it has an eccentric shaft system that applies stress on the test specimen, does not have the configuration to also apply a rotational stress to develop the fatigue test on a shaft other than the rotary shaft of the machine.

According to the foregoing, it is understood there is no document in prior art disclosing machines or mechanisms for stress fatigue testing and compression testing and rotational fatigue testing.

3. BRIEF DESCRIPTION OF THE INVENTION

The present invention corresponds to a machine for multiaxial fatigue, comprising a rotational mechanism, which is formed from a first power shaft with a first end connected to a first motor by means of a first coupling element; and a second end connected to a first fastening element. Moreover, the rotary mechanism has a driven shaft arranged collinearly with the first power shaft. This driven shaft has a first end connected to a fixed bearing; and a second end connected to a second fastening element. The second fastening element is arranged collinearly with the first fastening element; and a second coupling element connecting the first end to the second end.

Moreover, the machine has a reciprocating mechanism, which has a second power shaft connected to a second motor; a linear rotational transmission connected to the second power shaft; where the linear rotational transmission includes a bearing which connects to the driven shaft; and where the bearing applies a radial load on the driven shaft.

4. BRIEF DESCRIPTION OF THE FIGURES

FIG. 1 presents an isometric view with details of the rotational mechanism, power shaft, driven shaft, linear rotational transmission and single mode oscillatory mechanism of the machine for multi-axial fatigue.

FIG. 2 presents a detailed side view of the rotational mechanism, power shaft, driven shaft, linear rotational transmission and single mode oscillating mechanism of the machine for multi-axial fatigue.

FIG. 3 presents an exploded view of a multiaxial fatigue machine mode.

FIG. 4 corresponds to a multiaxial fatigue machine mode.

5. DETAILED DESCRIPTION OF THE INVENTION

Figure 1:
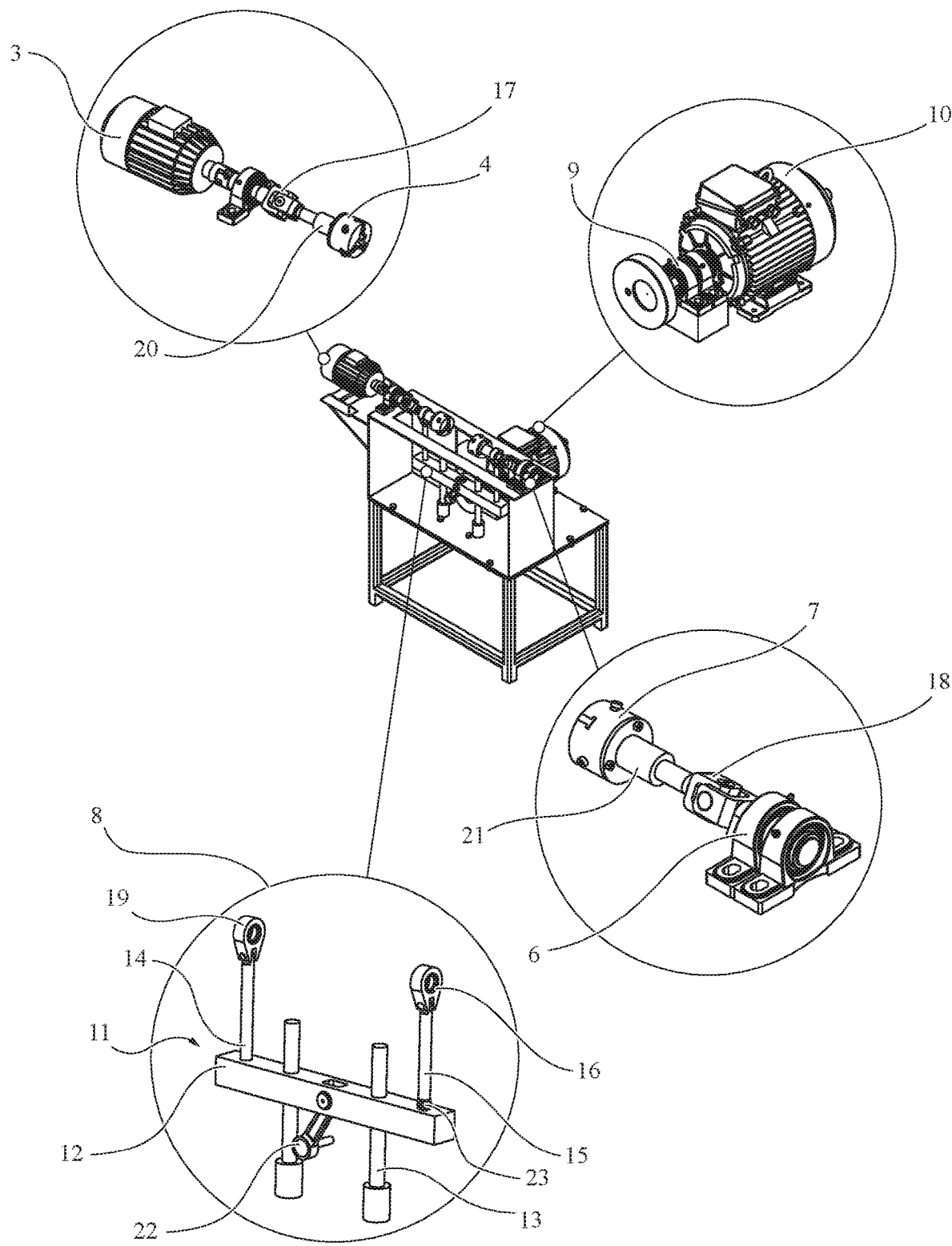

The present invention refers to a multiaxial fatigue machine (hereinafter machine). The machine uses a first motor (3) and a second motor (10) operating independently. When the two motors (3 and 10) work together, the machine is able to perform multi-axial fatigue tests on a sample.

On the other hand, when the motors alternate in their ignition, the machine is capable of subjecting a sample to rotational flexion or alternative flexion independently.

It will be understood from the present invention that a fatigue test consists of applying variable and repetitive stresses to a test element, or test tube, in order to determine the number of stress cycles the test element supports until it fails.

Fatigue failure develops from three stages (I, II and III): Stage I is the beginning of one or more micro cracks due to cyclic plastic deformation, followed by crystallographic propagation extending from two to five grains around the origin. Normally, stage I cracks are not normally discernible to the naked eye.

In stage II the microcracks become macrocracks forming parallel plateau-like fracture surfaces separated by longitudinal ridges. The plateaus are generally smooth and normal to the direction of maximum tensile stress. These surfaces may have dark and light marks known as beach marks, or shell marks. During cyclic loading, these cracked surfaces open and close, rubbing together. The beach mark appearance depends on the changes in the level or frequency of loading and the corrosive nature of the environment.

On the other hand, stage III occurs during the final stress cycle, when the remaining material cannot support the loads, resulting in a sudden, fast fracture. A stage III fracture may be brittle, ductile, or a combination of both.

Fatigue failure is due to crack formation and propagation. Usually, a fracture crack starts in a material discontinuity where the cyclic stress is maximum. Discontinuities may arise due to:

The design of quick changes in cross-section, wedges, holes, etc., where

Elements that rotate and/or slide together (bearings, gears, cams, etc.) under constant high pressure, which develops concentrated contact stresses below the surface, which may cause pitting or splintering after many load cycles.

Lack of care in the stamping locations, tool marks, scrapings and burrs; defective joint design; improper assembly; and other manufacturing errors.

The composition of the material itself after a rolling, forging, melting, stretching, heating process thereof, etc. Microscopic and submicroscopic discontinuities arise on or below the surface, as well as foreign material inclusions, alloy segregations, voids, hard particle precipitations and crystalline discontinuities.

Among the different conditions that may accelerate the crack onset, elevated temperatures, temperature cycles, a corrosive environment and high frequency cycles stand out.

Fatigue resistance is commonly interpreted by stress-life diagrams. The stress-life diagram (S-N) provides the fatigue resistance $S_f$ against the life cycle N of a material. The results are generated from tests in which a simple load is used on test elements. This test is a good approximation to the real conditions to which various elements of machines and structures are generally subjected.

In this invention it is understood that multiaxial fatigue testing is the combination of fatigue tests on a test item or test tube, applied in different shafts and directions.

In the present case, the fatigue is applied to rotary flexion and alternative flexion by the machine.

The rotary flexion consists of applying a load on an element submitted to a rotation; the rotation causes the fibers in flexion become to compression and the fibers in the inferior part in compression, become to flexion. Moreover, the element is subjected to torsional stresses accompanied by the above mentioned stresses. Repetitive movements cause fissures in the element, which gradually increase in size until the fracture becomes imminent.

Alternative flexion, on the other hand, consists of applying a determined force to a test element, which is subjected to alternative stress and compression above and below the element neutral stress line, until it finally fails due to alternating stresses.

Figure 2:
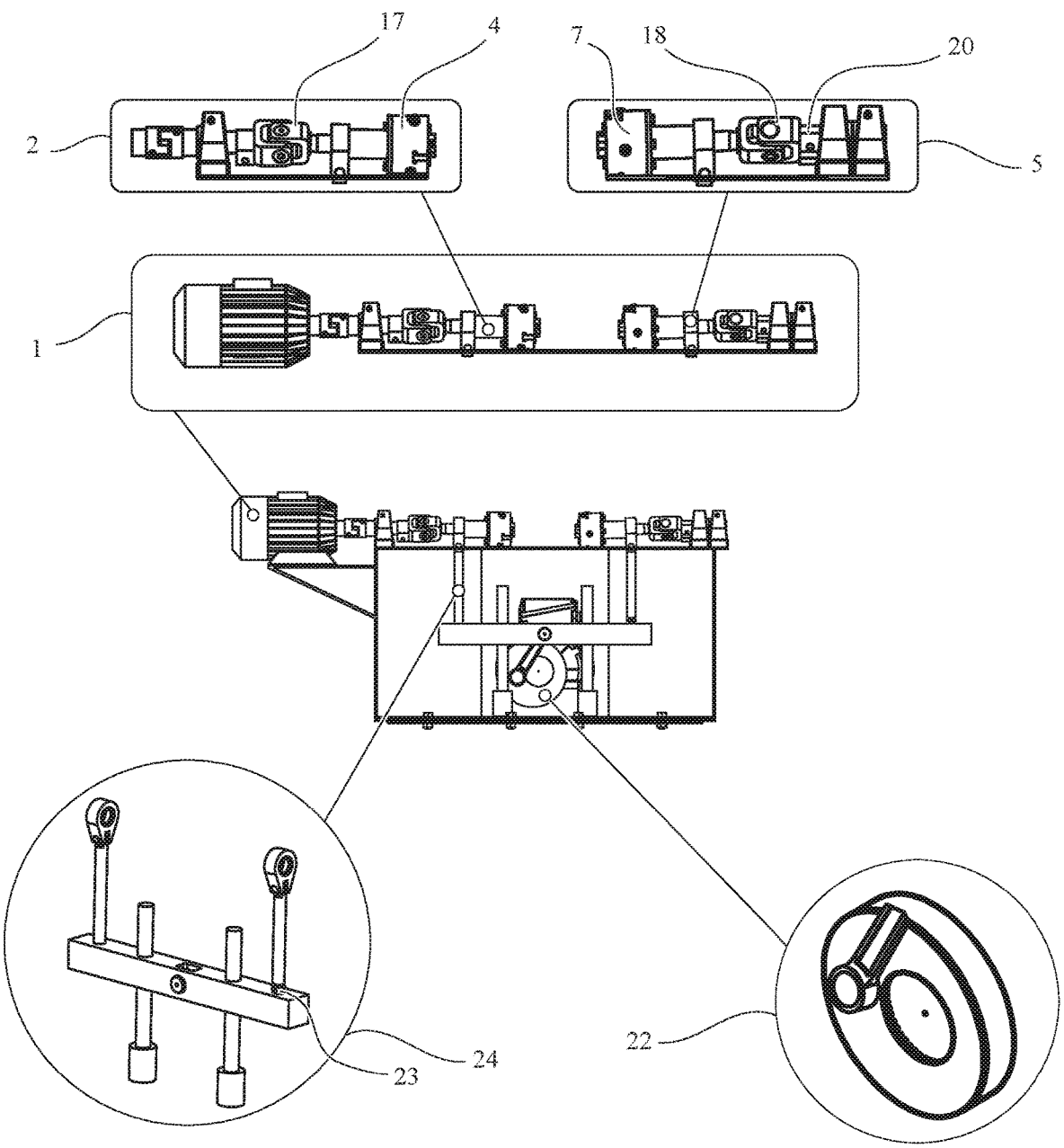
Figure 3:
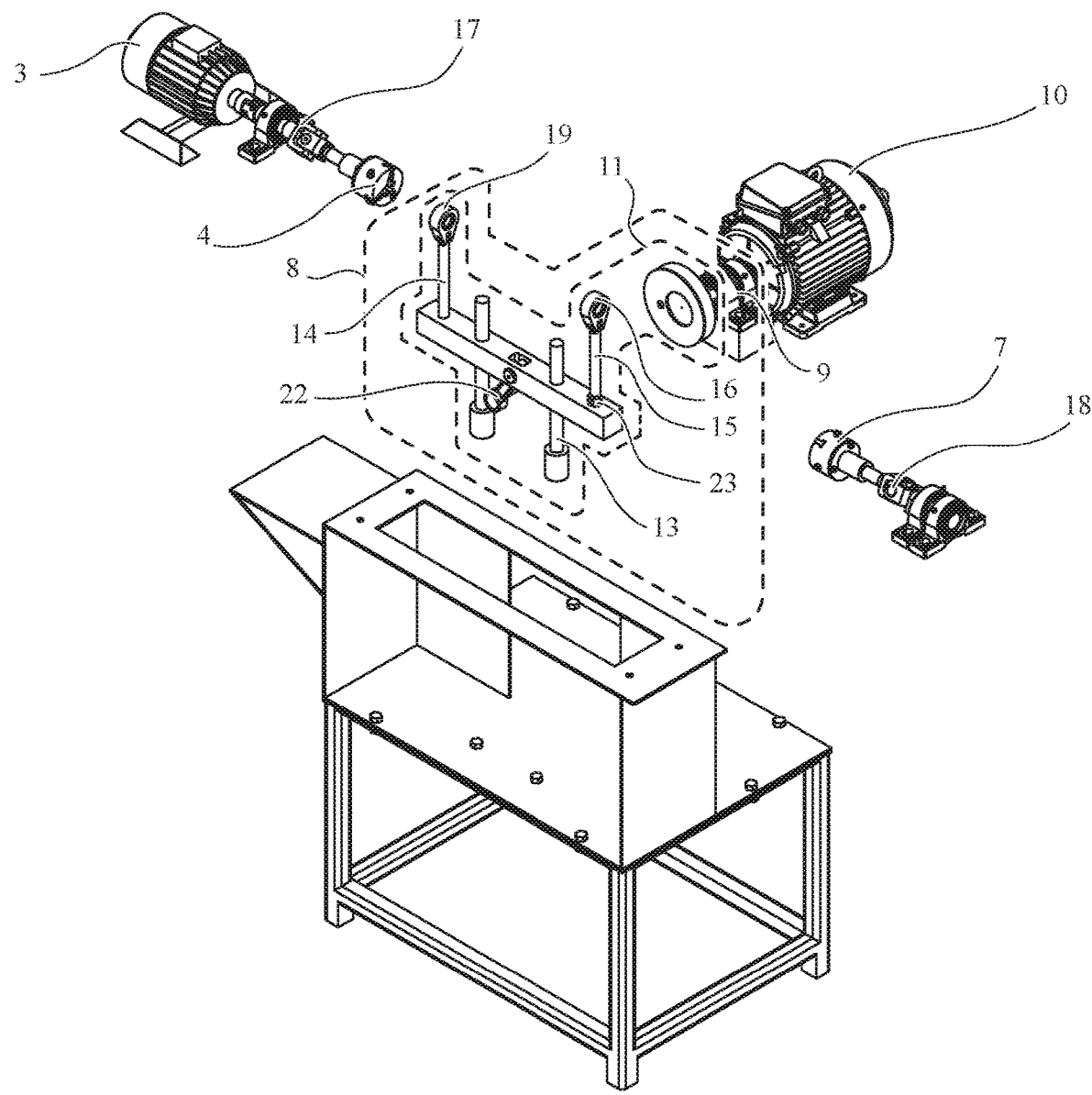
Figure 4:
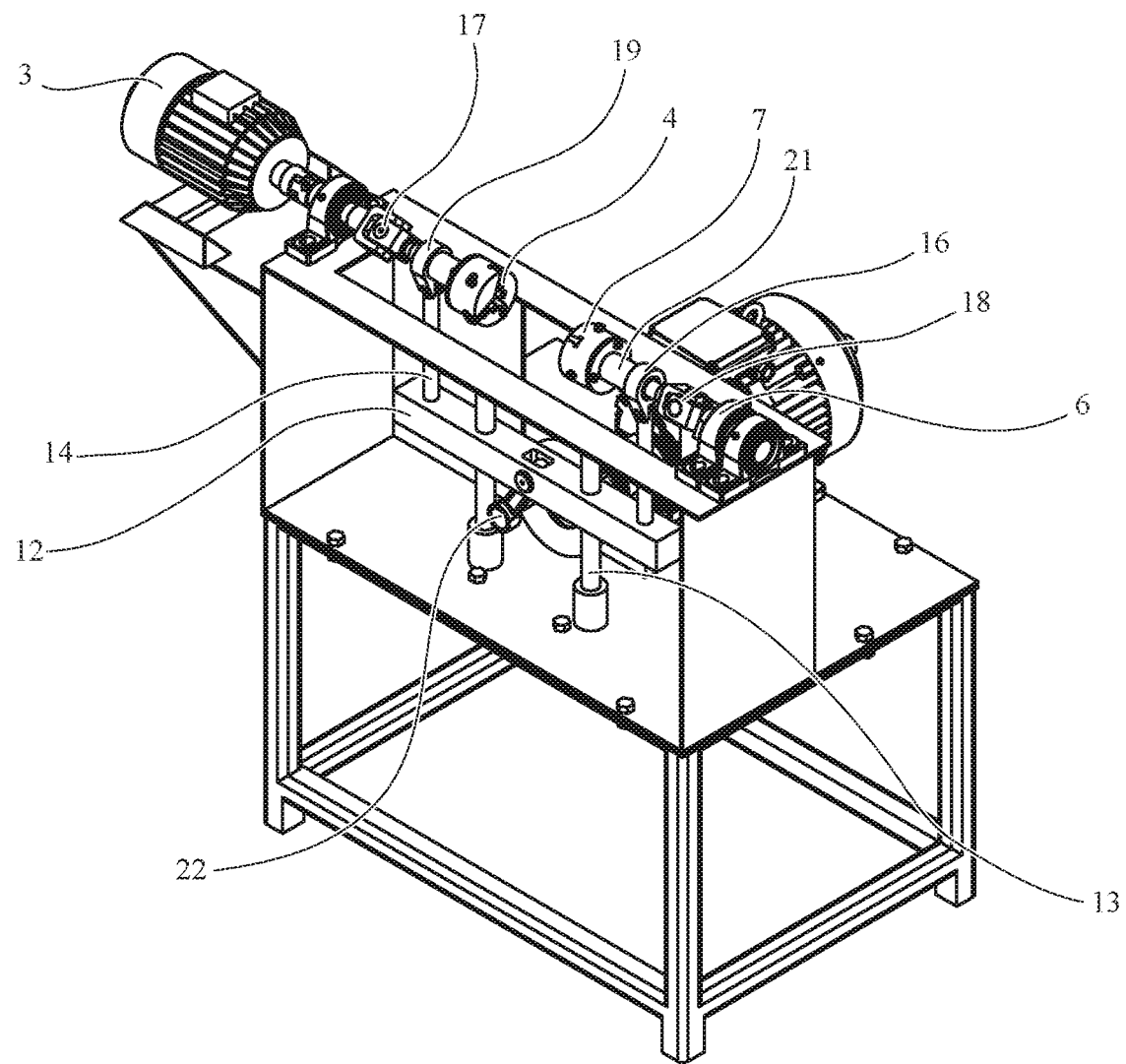

Referring to FIG. 1 and FIG. 2, in an invention embodiment, the machine comprises:
a rotational mechanism (1) comprising:
a first power shaft (2) with
a first end connected to a first motor (3) by a first coupling element (17); and
a second end connected to a first fastening element (4);
a driven shaft (5) arranged collinearly with the first power shaft (2), the driven shaft (5) comprising
a first end (20) connected to a fixed bearing (6);
a second end (21) connected to a second fastening element (7), where the second fastening element (7) is arranged collinearly with the first fastening element (4); and
a second coupling element (18) connecting the first end (20) to the second end (21);
a reciprocating mechanism (8) comprising:
a second shaft of power (9) connected to a second motor (10); and
a linear rotational transmission (11) connected to the second power shaft (9).

Referring to FIG. 2, the rotational mechanism (1) comprises a first power shaft (2) which transfers the rotation of the first motor (3) to the first fastening element (4), and this in turn transfers the rotation to the driven shaft (5) through the test element connected to the fastening elements (4 and 7).

In an invention embodiment, the coupling element (17) consists of a universal joint joined to a motor coupling, which may be a flexible coupling, chain coupling, cymbal coupling, by conical fastening and combinations thereof.

In an invention embodiment, the first end of the first power shaft rests on a bearing (6) located between the motor and the coupling element (17). This bearing (6) allows a better support of the first power shaft (2), thus reducing the stresses transmitted to the first motor (2).

On the other hand, the machine has coupling elements (17 and 18) allowing the vertical movement of the test element, when the alternative flexion is applied by the linear rotational transmission (11) and prevent the stresses and strains from affecting the rotary operation of the power shaft (2) and the driven shaft (5). Moreover, the coupling elements (17 and 18) avoid possible undesired stresses on the motors, due to fluctuating loads on the test element, and thus extend the motors lifetime.

In an invention embodiment, the coupling elements (17 and 18) are selected between universal joints, Rzeppa joints, cardan type couplings, flexible couplings, Omega type couplings, spider type couplings, among other elements allowing to transmit movement.

Rzeppa type joints, better known as "homokinetic ball joints", have the advantage of working under conditions where the arms attached to the joint experience a great variation in the angle between them, as in the application of this machine. Moreover, Rzeppa joints have the advantage of no clogging points when rotated and a radial load is applied to them, thanks to their coupled ball design.

Cardan couplings have the advantage that the instantaneous changes in angular velocity of one of the cardans and transmitted to the common body, are compensated in the opposite direction by the other, so the instantaneous angular velocities of the input and output shafts are equal at all times.

Omega type couplings are couplings with a flexible element, usually made of polyurethane, which do not require lubrication and are resistant to chemical agents, besides this, they adjust to misalignment, decreasing the reaction forces on the fixed bearings (6).

In an invention embodiment, fixed bearings (6) may be selected between ball bearings, needle roller bearings, journal bearings, angular contact bearings, axial contact bearings, roller bearings, double row ball bearings, bushings, hydraulic bearings and combinations thereof.

In a preferred invention embodiment, fixed bearings (6) are ball bearings, which have the advantage the internal track adjustment of the bearing is coupled to the shaft with a prisoner, which facilitates its maintenance, replacement and installation, and therefore its practicality in the present application. Moreover, the ball bearing supports axial loads, such as those exerted by the reciprocating mechanism (8).

In an invention embodiment, the support structure supporting all the elements of the machine is made up of a frame and a table with levellers.

In an invention embodiment, the frame is in charge of housing the machine as such.

In a preferred invention embodiment, the frame is composed of A36 steel sheets 4.5 mm thick, joined by coated arc welding.

The frame table supports the frame and facilitates its movement in the space required. It has levelers to adjust the machine level and keep it in a completely horizontal position. Moreover, the structure must be supported on a suitable surface to reduce vibrations and operating loads.

In an unillustrated invention embodiment, the table is coupled to a concrete mortar to decrease vibrations.

In an unillustrated invention embodiment, the frame has a table coupling system, which has a damping system which reduces vibration and avoids variations in measurement.

In an embodiment of the unillustrated invention, the frame contains housings for the fixed bearings (6) allowing them to be fixed and at the same time make it possible to align the power shaft (2) and the driven shaft (5) with each other.

On the other hand, the rotating mechanism (1) has fastening elements (4 and 7), which allow to fasten the test tube or test element subjected to the fatigue test.

In an invention embodiment, the first and second fastening elements (4 and 7) are selected from mandrels, presses and winch cups.

Mandrels are a special type of press used to hold an object, which usually has radial symmetry, mainly. Moreover, they have the advantage they allow the test tube or test element to be perfectly centered, when adjusted.

On the other hand, the rotational mechanism (1) has a driven shaft (5) that is arranged collinearly with the first power shaft (2), wherein this driven shaft (5) allows to support the rotation of the test element and at the same time transmits the force application of the reciprocating mechanism (8) on the test element.

In an invention embodiment, the motors (3 and 10), both first and second motor (3 and 10), may be selected between DC motors, synchronous motors, asynchronous motors, stepper motors, servomotors and brushless electric motors.

In a preferred invention embodiment for the selection of the first motor (3), the system inertia that would have to overcome the motor to start the rotation of the set containing the subject specimen, and thus induce it to failure by rotational fatigue, was taken into account.

In a preferred invention embodiment, as the second motor (10) a two-pole motor was selected, because for the machine operation the generation of speed is more important than torque, also it is important during its operation to generate high cycles in short periods of time designed for the duration of the tests.

On the other hand, the reciprocating mechanism (8) has a second power shaft (9), which transfers the power from the second motor (10) to the linear rotational transmission (11) in order to apply an alternating force on the test element.

In an invention embodiment, the linear-rotational transmission (11) comprises an oscillating mechanism (22) connected to the second power shaft (9), where the oscillating mechanism (22) may be selected between crank mechanisms, cam and follower mechanisms, eccentric wheel mechanisms, among others. Moreover, the linear rotational transmission (11) has an alternating element (12) connected to the oscillating mechanism (22) and a system of guides (24) connected to the alternating element (12) allowing a linear movement.

In a preferred invention embodiment, the oscillating mechanism (22) is an eccentric system for cyclic movement with pinions, where the second power shaft (9) is coupled to a crown, which is geared to a pinion coupled to the connecting rod of the crank mechanism.

In an invention embodiment, the system of guides (24) comprises the alternating element (12) connected to the oscillating mechanism (22), and at least one displacement guide (13) through which the alternating element (12) slides, allowing a linear movement.

Moreover, the system of guides (24) has a first arm (14) with a first end connected to the alternating element (12) and a second end connected to a first moving bearing (19). In turn, the first moving bearing (19) is connected to the power shaft (2).

Finally, the system of guides (24) has a second arm (15) with a first end connected to the alternating element (12), and a second end connected to a second mobile bearing (16), where the second mobile bearing (16) is connected to the driven shaft (5).

In a preferred invention embodiment, the system of guides (24) has two travel guides (13), one on each side as shown in FIG. 1, giving due support to the linear rotational transmission (11).

In an invention embodiment, the alternating element (12) is a rectangular cross-section bar with two passing vertical holes located in its medial region, and two vertical holes located near its longitudinal ends.

In an invention embodiment, the alternating element (12) also comprises a system of vertical guides with bearings, which allow the fluid linear movement of the alternating bar by reducing friction between the elements.

In an invention embodiment, alternating rod bearings are selected between copper bushings, ball bearings, needle roller bearings, double ball bearings and combinations between them.

Also, the alternating element (12) has a horizontal perforation located in its centroid, which serves to connect the connecting rod of the oscillating mechanism (22).

In the vertical perforations, the arms (14 and 15) are connected.

In an invention embodiment, the arms (14 and 15) and vertical perforations are connected by a threaded joint, where the arms (14 and 15) have a male thread at their lower end and the vertical perforations are threaded plugs.

In an invention embodiment, the vertical perforations with smooth and through-holes, and the arms (14 and 15) are secured to the alternating element (12) with a nut connected to the male thread. The nut is placed under the alternating element (12).

In an invention embodiment, mobile bearings (16 and 19) are radial spherical plain bearings, which are suitable for applications where alignment movements between shaft and housing need to be supported. They are also suitable for applications where alternating loads must be supported.

In an invention embodiment (not illustrated), the machine has a data retrieval device with sensors to measure applied force and number of cycles, where the sensors are connected to the shafts of the rotational mechanism and reciprocating mechanism.

In an invention embodiment, the data retrieval device comprises:
- at least one frequency converter connected to the first and second motor (3 and 10);
- an ignition system connected to the first and second motors;
- a position selector;
- a force sensor (23) connected to the first end of the second arm (15) of the reciprocating mechanism (8);
- speed sensors connected to the rotational mechanism (1) by means of the driven shaft (5);
- a data acquisition card, connected to the sensors, the frequency inverter, the ignition system and the position selector.

The frequency variator allows to increase or decrease the motors speed, which in turn translates into the variation of the stress cycles on the test element. Moreover, the frequency variator allows different speeds and torques, which is not possible to achieve with mechanical transmissions, such as worm and crown gearmotors, step gearmotors, planetary gearmotors, among others.

The position selector allows the machine to be operated either by rotary flexion, alternative flexion or a combination of both to perform the multi-axial fatigue test. The above modes of operation are achieved by using either the first motor (3) (rotary flexion), only the second motor (10) (alternative flexion) or by using both motors (Multiaxial Fatigue).

In an invention embodiment, force sensors (23) may be selected between load cells, strain gauges, force transducers, among others. On the other hand, speed sensors may be selected between a sprocket and hall type sensor.

Load cells are structures designed to support compression, tension and flexion loads, inside of which are one or more strain sensors called Strain Gages, which detect the strain values where they are located. One of the advantages of load cells is their accuracy and calibration ease, in order to take accurate data during tests.

The speed sensor, comprising a sprocket and hall type sensor has the advantage of its simplicity in measurement, since only a sprocket coupled to the shaft and the sensor located in a position where it can measure the teeth of that wheel are needed. Moreover, it has the advantage of invariability in the measurement against external dirt.

Example 1

A materials testing machine is designed and built capable of multiaxial fatigue, using rotary flexion fatigue and alternative flexion fatigue.

The machine has a rotary mechanism (1) and a reciprocating mechanism (9) which apply rotary flexion and alternative flexion, respectively.

The rotary mechanism has two rotary shafts, a power shaft (3) and a driven shaft (10), which allow the rotational movement of the entire system.

The power shaft is connected at one end to the first motor and at the other end to a universal joint. The free end of the universal joint is also connected to a first specimen fastener.

The driven shaft is connected at one end to a support bearing and at a second end to a universal joint. The free end of the second universal joint is also connected to a second specimen fastener.

The fastening elements (4 and 7) are winch cups, which have an outside diameter of 80 mm and an optimum fastening diameter of ⅝" according to the dimensions of the test tubes.

The first motor is a 1.5 hp three-phase motor with a nominal speed of 3600 rpm and direct start.

The reciprocating mechanism has a second rotary shaft, connected to the second motor (10) at one end, and at the other end to an eccentric system for cyclic movement with pinions.

The second motor of the reciprocating mechanism is a motor with frequency 60 Hz, synchronous speed 3600 RPM, nominal power of 3 hp, nominal voltage 220/440 V, degree of protection IP55.

The rotational-linear transmission comprises a crank mechanism connected to an alternating bar, which transmits the thrust movement of the crank to the alternating flexion application arms.

The alternating element (12) has a load cell arranged at the junction between the alternating rod and the second arm, with which the load on the test tube or test element is measured.

Example 2

For the experimental verification of the multiaxial fatigue machine, test tubes of two materials were used, Steels AISI/SAE 1045 and ASTM A-36. Tensile tests were performed for the two materials and rotary flex fatigue tests (AISI/SAE 1045) and alternative flexure tests (ASTM A-36), for the construction of the specimens to be fatigue tested, the fatigue test standard ASTM E-606 was used.

The tensile tests were constructed with cylindrical geometries (AISI/SAE 1045), with an initial diameter test section of 6.58 mm and an initial length of 50 mm; and samples with square geometry (ASTM A-36) with an initial thickness test section of 4.5 mm and a width of 10.12 mm. The results of these tests are shown in the following table.

| Property | Traction test results. | |
|---|---|---|
| | Steel AISI 1045 (MPa.) | Steel ASTM A36 (MPa.) |
| Yield stress ($S_y$) | 765 | 252 |
| Ultimate stress ($S_{ut}$) | 842 | 437 |

For the development of the rotary flex fatigue tests, a total of 10 samples were used, using two samples per stress level, starting with a stress $S_x = 0.75\ S_y$, and decreasing by 10% progressively until all 10 samples were completed. When the failure of each sample occurred, the number of cycles and the time consumed in the failure were recorded. The data are presented in the following table.

| Rotary flexion test results Steel AISI/SAE 1045 | | | |
|---|---|---|---|
| Test tube No | $S_y$ Percentage | Stress (MPa) | Cycles to failure |
| 1 | 75% | 573 | 27328 |
| 2 | 75% | 573 | 22682 |
| 3 | 65% | 497 | 90944 |
| 4 | 65% | 497 | 107186 |
| 5 | 55% | 420 | 144163 |
| 6 | 55% | 420 | 185456 |

-continued

Rotary flexion test results
Steel AISI/SAE 1045

| Test tube No | $S_y$ Percentage | Stress (MPa) | Cycles to failure |
| --- | --- | --- | --- |
| 7 | 45% | 344 | 249235 |
| 8 | 45% | 344 | 296823 |

For the development of the alternative flexion tests, six test tubes were used, using one sample per stress level, starting with a stress $S_x=0.56\ S_y$, decreasing progressively by 5% until completing the six samples. When the failure of each sample occurred, the number of cycles and the time consumed in the failure were recorded. The data are presented in the following table.

Alternative flexion test results
Steel ASTM A-36

| Test tube No | $S_y$ Percentage | Stress (MPa.) | Cycles to failure |
| --- | --- | --- | --- |
| 1 | 0.56 | 141 | 4841 |
| 2 | 0.5 | 125 | 8278 |
| 3 | 0.45 | 113 | 8388 |
| 4 | 0.4 | 100 | 12255 |
| 5 | 0.35 | 88 | 19506 |
| 6 | 0.3 | 75 | 30795 |

The results were plotted in S vs N curves, considering the ASTM E-739 standard "Statistical Analysis of Linearized or Linearized Stress-Life (S-N)" for the adjustment of experimental data. Following the standard guidelines, the values obtained from life cycles during the experimental trials were plotted in the Stress plane ($S_x$) against number of cycles (N) to form the S vs N curve. The results thus obtained were adjusted by exponential regression to obtain a curve $S_x = A \cdot N^b$, known in the literature as the Basquin exponential representation. N (fatigue life) was then defined as the dependent variable and $S_x$ (stress) as the independent variable.

Figure 5:
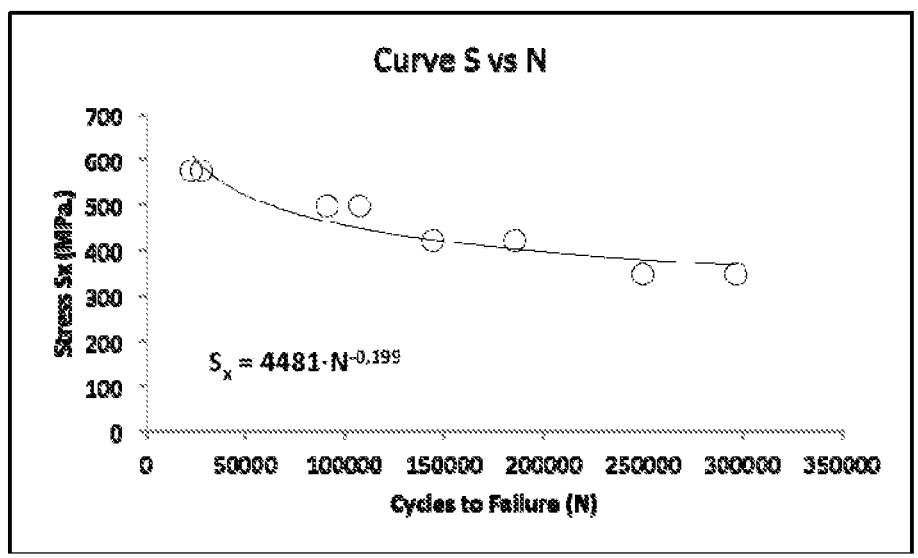
FIG. 5 shows the results of the rotary flexion fatigue test.

FIG. 5 shows the results of the rotary flexion fatigue test. As shown in the figure, a portion of the high cycle curve has been plotted. Also, a potential trend and the results of the constants of the equation proposed by Basquin are noted.

Figure 6:
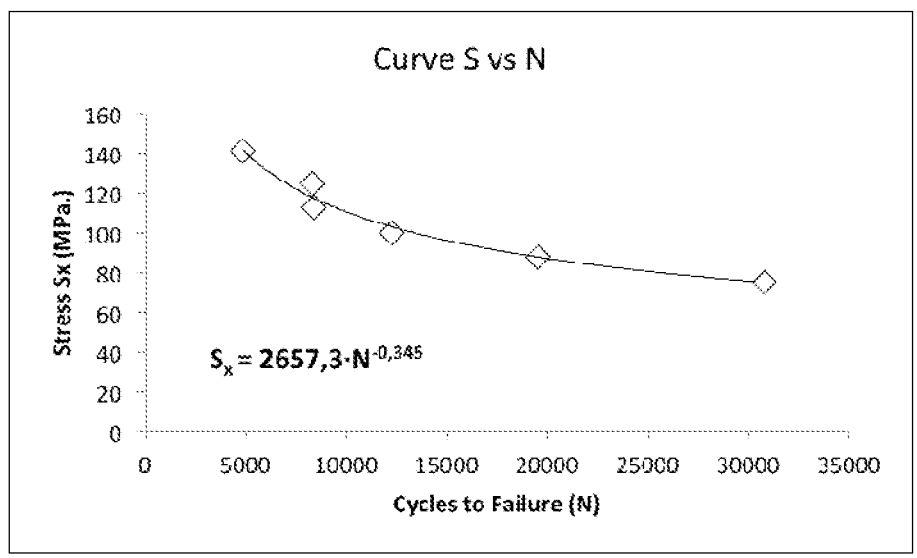
FIG. 6 shows the results of the alternative flexion fatigue test.

FIG. 6 shows the results of the alternative flex fatigue test. As shown in the figure, a portion of the high cycle curve has been plotted. Also, a potential trend and the constant results of the equation proposed by Basquin are noted.

It must be understood that the present invention is not limited to the embodiments described and illustrated herein, and that skilled artisans will understand that numerous variations and modifications may be made, which do not depart from the invention scope and spirit, which is only defined by the following claims.

The invention claimed is:

1. A multiaxial fatigue machine comprising:
   a rotational mechanism comprising:
      a first power shaft with
         a first end connected to a first motor by a first coupling element; and
         a second end connected to a first fastening element;
      a driven shaft arranged collinearly with the first power shaft, the driven shaft comprising
         a first end connected to a fixed bearing;
         a second end connected to a second fastening element, where the second fastening element is arranged collinearly
            with the first fastening element; and
         a second coupling element connecting the first end to the second end;
   a reciprocating mechanism comprising:
      a second power shaft connected to a second motor; and
      a linear rotational transmission connected to the second power shaft,
   wherein the first fastening element and the second fastening element are configured to be connected to a test element and transmit to said test element a rotational force produced by the first motor, and
   wherein the second power shaft is configured to transfer power from the second motor to the linear rotational transmission in order to apply an alternating force on the test element.

2. The machine of claim 1, wherein the first coupling element and second coupling element are universal joints.

3. The machine of claim 1, wherein the first and second fastening elements are mandrels.

4. The machine of claim 1, wherein the linear rotational transmission comprises:
   an oscillating mechanism connected to the second power shaft;
   an alternating element connected to the oscillating mechanism; and
   a system of guides connected to the alternating element.

5. The machine of claim 4, wherein the system of guides comprises:
   an alternating element connected to the oscillating mechanism;
   at least one sliding guide where the alternating element slides, allowing a linear movement;
   a first arm with a first end connected to the alternating element and a second end connected to a first mobile bearing, in turn, the first mobile bearing is connected to the power shaft;
   a second arm with a first end connected to the alternating element, and
   a second end connected to a second mobile bearing, where the second mobile bearing is connected to the driven shaft.

6. The machine of claim 4, wherein the oscillating mechanism is a crank mechanism.

7. The machine of claim 1, characterized by a data retrieval device with sensors to measure applied force and number of cycles; where force sensors are located at the first end of the second arm; and where speed sensors are connected to the rotational mechanism shafts and reciprocating mechanism.

8. The device of claim 7, characterized because the data retrieval device includes:
   at least one frequency converter connected to the first and second motor;
   an ignition system connected to the first and second motors;
   a position selector;
   a force sensor connected to the first end of the second arm of the reciprocating mechanism;
   speed sensors connected to the rotational mechanism by means of the driven shaft;
   a data acquisition card, connected to the sensors, the frequency inverter, the ignition system and the position selector.

9. The device of claim 7, characterized because the force sensors of the data retrieval device are load cells.

10. The device of claim 7, characterized because the speed sensor is a sprocket and hall type sensor.

\* \* \* \* \*